United States Patent [19]

Rehak

[11] 3,982,219

[45] Sept. 21, 1976

[54] DIGITAL PRESSURE/RANGE TRANSDUCER
[75] Inventor: Dale J. Rehak, Woodbridge, Va.
[73] Assignee: The United States of America as represented by the Secretary of the Army, Washington, D.C.
[22] Filed: Feb. 19, 1975
[21] Appl. No.: 551,186

[52] U.S. Cl. .............................. 338/96; 200/85 R; 338/114
[51] Int. Cl.² ........................................ H01C 10/06
[58] Field of Search ............... 338/96, 99, 110, 114, 338/138, 139, 140; 73/141 A; 200/85

[56] References Cited
UNITED STATES PATENTS 2,345,409  3/1944  Mason .................................. 338/96
2,586,544  2/1952  Kesselring ........................... 338/114
3,610,699  10/1971  Ladoniczki ........................... 338/96

FOREIGN PATENTS OR APPLICATIONS 1,059,186  2/1967  United Kingdom .................. 338/99

Primary Examiner—David Smith, Jr.
Attorney, Agent, or Firm—Nathan Edelberg

[57] ABSTRACT

A digital pressure/range transducer is disclosed. The transducer transforms an applied force into a mechanical movement which in turn closes a plurality of switches in ordered sequence. The number of switches closed gives a measure of the applied force. The transducer can be configured as a cable and when so configured the location of a closed switch or switches along the length of the cable can be determined.

9 Claims, 4 Drawing Figures

DIGITAL PRESSURE/RANGE TRANSDUCER

The invention described herein may be manufactured, used, and licensed by or for the Government for Governmental purposes without the payment to me of any royalties thereon.

BACKGROUND OF THE INVENTION

This invention relates to pressure transducers, and more particularly, to a digital pressure/range transducer.

There are a host of applications where it is desired to measure an applied force or pressure. Further, in certain cable applications one not only wants to know the applied force or pressure on the cable but also the location of this force or pressure along the cable. Of course, many techniques for measuring an applied force have been devised and some of these techniques utilize pressure or force transducers. However, many of these prior art transducers have deficiencies which render them unsuitable for universal application. For example, many of the prior art transducers are so constructed that they are not well suited to have a cable configuration. There are, however, some prior art transducers that can be conveniently constructed in a cable configuration, but generally these prior art cable transducers are analog devices. Such analog devices generate noise as well as the signal and therefore, complicated data processing electronics is required to separate the signal from the noise. Further, with many of these prior art cable configured transducers the location of the force along the cable is indeterminable.

This invention provides a digital transducer that avoids the aforementioned problems. Further, the transducer of this invention can be configured as a short segment or as a long cable.

SUMMARY OF THE INVENTION

The transducer of this invention is basically a wedge or hinge structure. One element of the wedge is made of a relatively hard material and has a plurality of parallel conductors, round or flat wires, embedded in one of its surfaces. The other element of the wedge is made of a conductive material or has a layer of conductive material formed on one of its surfaces. If a conductive layer is provided, the two elements are so assembled that the parallel conductors and the conductive layer face each other. These two elements are assembled as a transducer structure in which the distance between the two elements progressively varies when going from one edge to the other edge of each of the elements.

When a force is applied to this wedge the parallel conductors will come in contact with the conductive surface in an ordered sequence. That is, the greater the force the larger will be the number of parallel conductors that come in contact with the conductive surface. Thus, as an applied force is increased the number of parallel conductors that contact the conductive surface of the other side will increase.

The plurality of parallel conductors in combination with the conductive surface can be considered as comprising a switch having a plurality of contacts. By monitoring these individual switch contacts, the number of closed contacts can be determined, thereby providing a digital measure of the applied force.

The transducer of this invention can be fabricated as a short segment or can be fabricated as a cable. If a cable configuration is provided, the point along the cable at which a force is applied can be determined with the transducer of this invention as well as the magnitude of the force applied at that point.

BRIEF DESCRIPTION OF THE DRAWING

The exact nature and structural details of the invention will be readily apparent from the following detailed description when read in conjunction with the annexed drawing in which.

DETAILED DESCRIPTION OF THE INVENTION

Figure 1:
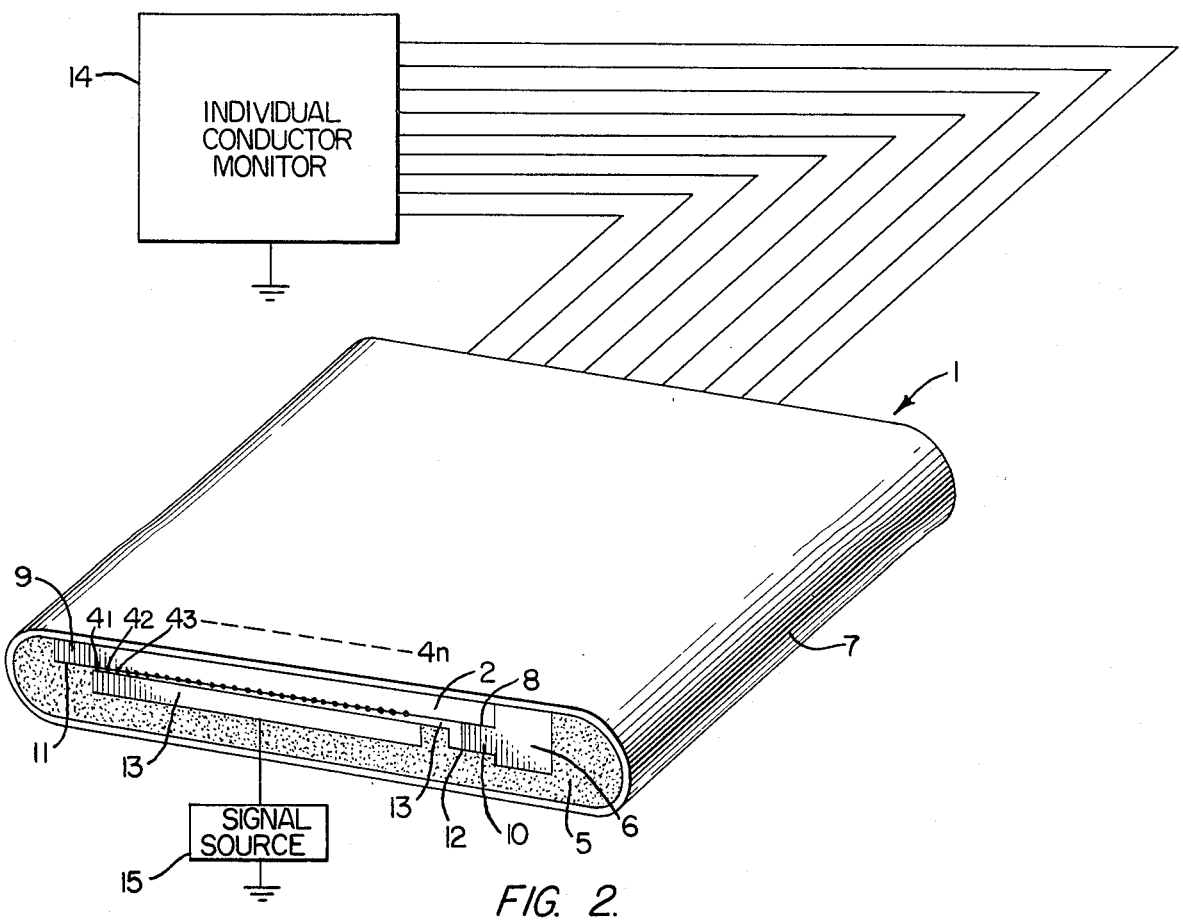
FIG. 1 shows a preferred embodiment of the invention configured as a short segment.
Figure 2:
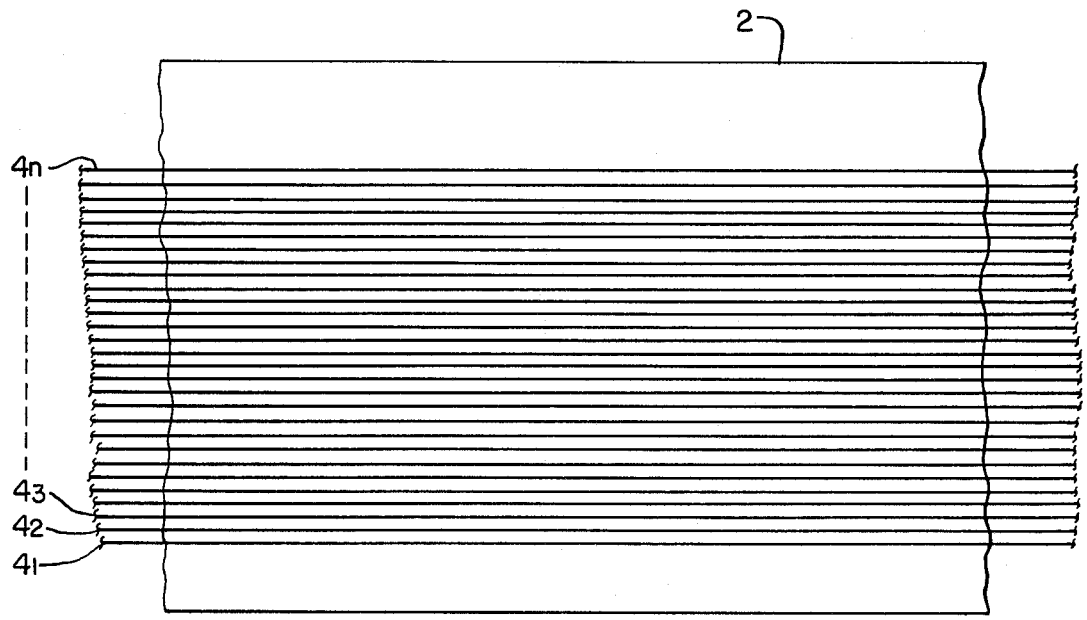
FIG. 2 shows in detail an element of the embodiment of FIG. 1.

Referring to FIG. 1, this Figure shows a preferred embodiment of the transducer of this invention configured as a short segment. As shown in FIG. 1, transducer 1 comprises a wedge or hinge shaped structure comprising the sides or elements 2 and 3. Element 2 is made of a relatively hard material and is generally rectangular in shape. A plurality of parallel conductors $4_1, 4_2, 4_3$ - - - $4_n$ are imbedded in one surface of element 2 as is more clearly shown in FIG. 2 which shows a broken section of element 2 removed from transducer 1. The parallel conductors $4_1, 4_2, 4_3$ - - - $4_n$ may be round bare wires imbedded in the surface of element 2 or flat ribbon conductors formed on the surface of element 2. In FIG. 1, element 2 forms the top of the wedge structure with parallel conductors $4_1, 4_2, 4_3$ - - - $4_n$ facing downward toward element 3 which forms the other side of the wedge.

Element 3 which is also rectangular shaped is formed from a low modulus electrically conductive material. Instead of using a conductive material to form element 3, a suitable nonconductive material having a conductive layer formed on one surface may be used. If a conductive layer is provided, the layer will be formed on the surface of element 3 that faces upward in FIG. 1, that is, toward parallel conductors $4_1, 4_2', 4_3,$ - - - $4_n$, Element 5 which is made from a compressible or deformable material is formed in the irregular shape shown in FIG. 1. Element 5 is shaped to accommodate the various elements of transducer 1. Thus, element 3 is seated in a pocket formed in element 5 and is secured to element 5 by means of epoxy or like. Edge 9 of element 2 rests on the ledge 11 formed in element 5. Irregular shaped element 6 which is also made from a compressible material fits into a channel formed in element 5 with the protrusion 10 of element 6 resting on the ledge 12 formed in element 5. Edge 8 of element 2 rests on top of protrusion 10 of element 6. After the various elements are assembled as described, the entire assembly is covered with a protective sheath 7.

Elements 2 and 3 assembled and constructed as described above and as shown in FIG. 1 form a wedge shaped or hinged structure with parallel conductors $4_1, 4_2, 4_3$ - - - $4_n$ separated from the top surface of element 3 by the space labelled 13 in FIG. 1. As shown, space 13 is wedge shaped; that is, the space 13 between parallel conductors $4_1, 4_2, 4_3$ - - - $4_n$ progressively decreases going from edge 8 of element 2 to edge 9 of of element 2. Thus, conductor $4_1$ is closer to the top surface of element 3 than conductor $4_2$ and conductor $4_2$ is closer than conductor $4_3$, etc.

If a downward force is applied to the top surface of transducer 1, conductors $4_1, 4_2, 4_3 - - - 4_n$ will move toward the top surface of element 3 with conductor $4_1$ contacting the top surface of element 3 first and then each of the conductors $4_2, 4_3 - - - 4_n$ progressively touching the top surface of element 3 in an ordered sequence as the downward force on the top of transducer 1 is increased. In other words, one or more of the parallel conductors $4_1, 4_2, 4_3 - - - 4_n$ will be forced downward to contact the top surface of element 3 depending upon the magnitude of the force applied. Thus, the number of conductors touching the top surface of element 3 provides a measure of the force applied to transducer 1.

Of course, one has to be able to determine which of the conductors $4_1, 4_2, 4_3 - - - 4_n$ are actually touching the top surface of element 3 to be able to obtain a measure of the force in this manner. FIG. 1, shows a convenient method of determining which of the parallel conductors $4_1, 4_2, 4_3 - - - 4_n$ is touching the element 3 under a given force. Element 3 or the conductive surface of element 3, as the case may be, in combination with parallel conductors $4_1, 4_2, 4_3 - - - 4_n$ can be considered as an electrical switch having a plurality of contacts. The plurality of contacts being formed by the plurality of parallel conductors $4_1, 4_2, 4_3 - - - 4_n$. Thus, if the closing of each switch contact is monitored one can determine how many of the parallel conductors $4_1, 4_2, 4_3 - - - 4_n$ are in contact with element 3 due to the application of a given force. This can be accomplished by coupling a signal source such as the signal source 15 to element 3 and by coupling parallel conductors $4_1, 4_2, 4_3 - - - 4_n$ to a suitable individual conductor monitor such as the monitor 14 of FIG. 1.

Signal source 15 can be any suitable source, for example, a D.C. voltage. If a D.C. voltage is used for signal source 15, monitor 14 need merely be simple electronic circuitry that will sense the application of the D.C. voltage to each of the switch contacts, considering parallel conductors $4_1, 4_2, 4_3 - - - 4_n$ as being the contacts of a multiple contact switch formed by these parallel conductors and element 3 as previously mentioned. Monitor 14 could include a meter that merely indicates which of the contacts are closed or monitor 14 could be coupled to well known processing electronic circuitry and a meter which would provide a direct read-out of the value of the force applied. The use of a D.C. voltage source as signal source 13 and a contact closing monitor for monitor 14 is given by way of example only. Other known signal sources and known monitoring electronics could be used as will be obvious to those skilled in the art. A significant fact, however, is that transducer 1 provides for a digital output of the force applied; and thus, any circuitry utilized would be digital circuitry. The fact that the transducer provides digital signals is of particular significance when the transducer is configured as a long cable.

Figure 3:
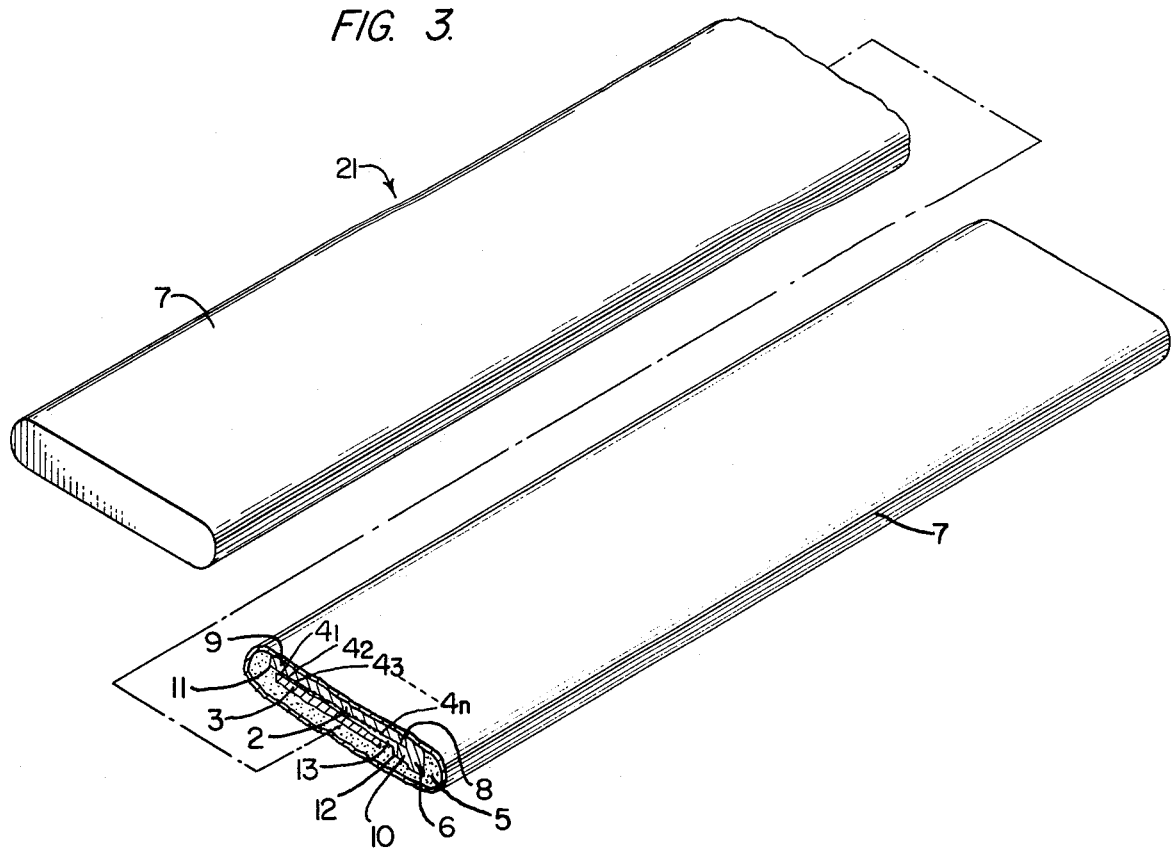
FIG. 3 shows the preferred embodiment of FIG. 1 configured as a long cable.

FIG. 3 shows the transducer of this invention configured as a long cable. Except for the fact that transducer 21 of FIG. 3 is longer than transducer 1 of FIG. 1, the two transducers are identical in structure. Therefore, the like components in FIGS. 1 and 3 have like numerals. Thus transducer 21 comprises element 2 having the plurality of face conductors $4_1, 4_2, 4_3 - - - 4_n$ imbedded in one surface, conductive element 3 located below element 2, irregular element 5, second irregular shaped element 6 all assembled as shown and covered by a protective sheath 7. Suitable electronic circuitry (not shown) such as shown in FIG. 1 with transducer 1 would be provided with transducer 21. Thus any force applied to transducer 21 and the magnitude of that force would be monitored. Since transducer 21 provides a digital indication of the force as described previously with reference to transducer 1 of FIG. 1, the output signals produced by transducer 21 are not subjected to any noise interference. In many prior art long cable force or pressure transducers, the signals provided in response to a force are analog signals. In such devices noise is also generated and this noise of course interferes with the signal.

Figure 4:
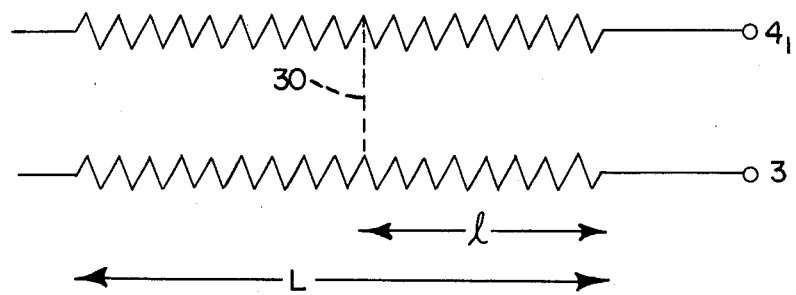
FIG. 4 is a schematic diagram used to describe a feature of the long cable configuration of FIG. 3.

In addition to providing a measure of any force applied at some point along transducer 21, the point at which the force is applied can also be determined. Thus, transducer 21 not only provides a measure of a force but also the location of this force along the transducer cable. The fact that the location of the force can be determined is illustrated by FIG. 4. In FIG. 4, conductor $4_1$ is shown as a resistance, and transducer 21 is shown as having a length L. If contact $4_1$ is closed at the point 30 by a force applied to the transducer cable 21 at this point as illustrated by the dotted line at this point (that is conductor $4_1$ is brought into contact with element 3); the distance "l" of point 30 along the cable can be determined as follows:

$$ l = \left( \frac{L}{R_{4_1} + R_3} \right) R $$

where
L = total length of transducer 21
$R_{4_1}$ = known total resistance of $4_1$
$R_3$ = known total resistance of element 3; and
R = resistance measured between $4_1$ and 3 when conductor $4_1$ is in contact with element 3. Of course, in order to calculate the distance "l", appropriate metering to measure the resistance between conductor $4_1$ and element 3 when conductor $4_1$ is brought into contact with element 3 is required. Such metering devices are, of course, well known in the art and in a given application could be coupled across conductor $4_1$ and element 3 as part of the electronic circuitry. This metering would be associated conductor $4_1$ rather than one of the other conductors since this conductor may be the only conductor brought into contact with element 3 depending upon the magnitude of the applied force and will always be brought into contact with element 3 if any of the other conductors are brought into contact with element 3.

While the invention has been described with reference to a specific embodiment configured as a short segment and as a long cable, it will be obvious to those skilled in the art that various changes and modifications can be made to both the short segment and long cable configurations without departing from the spirit and scope of the invention as set forth in the claims.

What is claimed is:
1. A pressure transducer comprising:
a first element made of rigid material;
a plurality of parallel bare conductors attached to one surface of said first element; and
a second element having at least one electrically conductive surface; and means to assemble said first and second element in such a manner that said plurality of parallel bare conductors is facing said at least one conductive surface of said second element but spaced apart therefrom, and such that the space between said at least one conductive surface and said plurality of parallel bare conductor progressively increases in a direction at right angles to the longitudinal axis of each of said plurality of parallel conductors such that said first and second elements form a wedge shape, said means to assemble said first and second elements being compressible whereby said plurality of parallel bare conductors will, under the influence of a force applied to said transducer, progressively contact said at least one conductive surface in an ordered sequence, the number of said plurality of parallel bare conductors contacting said at least one conductive surface under the influence of a given force being directly related to the magnitude of said force; the last said means including a first irregular shaped compressible element having a pocket in which said second element is secured, a ledge to support one edge of said first element and a channel, a second irregular shaped compressible element located in said channel and having a protrusion to support the other edge of said first element such that said other edge of said first element is separated from said at least one conductive surface of said first element by a distance greater than the distance that said one edge of said first element is separated from said at least one conductive surface of said second element, and a protective sheath covering the entire assembled pressure transducer.

2. A pressure transducer as defined in claim 1 wherein said pressure transducer is configured as a short segment.

3. A pressure transducer as defined in claim 1 wherein said transducer is configured as a long cable.

4. A pressure transducer as defined in claim 2 wherein a signal source is coupled to said second element and an individual conductor monitor responsive to said signal source is coupled to each conductor of said plurality of parallel bare conductors.

5. A pressure transducer as defined in claim 3 wherein a signal source is coupled to said second element and an individual conductor monitor responsive to said signal source is coupled to each conductor of said plurality of parallel bare conductors.

6. A pressure transducer as defined in claim 1 wherein said plurality of parallel bare conductors are round wires that are attached to said one surface of said first element by imbedding said round wires in said one surface of said first element.

7. A pressure transducer as defined in claim 1 wherein said plurality of parallel bare conductors are flat ribbon conductors formed on said one surface of said first element.

8. A pressure transducer as defined in claim 6 wherein said second element is entirely formed of an electrically conductive material.

9. A pressure transducer as defined in claim 7 wherein said second element is entirely formed from an electrically conductive material.

* * * * *